US011034499B2

(12) United States Patent
Maschio

(10) Patent No.: US 11,034,499 B2
(45) Date of Patent: Jun. 15, 2021

(54) METAL CAGE FOR TANKS

(71) Applicant: Maschio N.S. S.R.L., Grezzago (IT)

(72) Inventor: Pietro Maschio, Pozzo d'Adda (IT)

(73) Assignee: Maschio N.S. S.R.L., Grezzago (IT)

( * ) Notice: Subject to any disclaimer, the term of this patent is extended or adjusted under 35 U.S.C. 154(b) by 209 days.

(21) Appl. No.: 16/105,328

(22) Filed: Aug. 20, 2018

(65) Prior Publication Data

US 2019/0062024 A1 Feb. 28, 2019

(30) Foreign Application Priority Data

Aug. 22, 2017 (IT) .................. 102017000095075

(51) Int. Cl.
*B65D 77/04* (2006.01)
*B65D 19/02* (2006.01)
*B23K 31/02* (2006.01)
*B65D 77/06* (2006.01)
*B65D 19/08* (2006.01)
*B65D 19/10* (2006.01)

(52) U.S. Cl.
CPC .......... *B65D 77/0466* (2013.01); *B23K 31/02* (2013.01); *B65D 19/02* (2013.01); *B65D 19/08* (2013.01); *B65D 19/10* (2013.01); *B65D 77/04* (2013.01); *B65D 77/06* (2013.01); *B65D 2519/00512* (2013.01); *B65D 2519/00522* (2013.01); *B65D 2519/00532* (2013.01); *B65D 2519/00557* (2013.01)

(58) Field of Classification Search
CPC ............................ B65D 77/0466; B65D 25/20
USPC .................... 220/23.91, 88.1, 650
See application file for complete search history.

(56) References Cited

U.S. PATENT DOCUMENTS

| 5,645,185 A | * | 7/1997 | Cassina | B23K 11/14 220/1.5 |
| 5,678,688 A | * | 10/1997 | Schutz | B65D 77/0466 206/386 |
| 5,924,589 A | * | 7/1999 | Gordon | A62C 2/065 220/23.87 |
| 6,042,237 A | * | 3/2000 | De Vaan | G02F 1/133621 353/38 |

(Continued)

OTHER PUBLICATIONS

Italian Search Report issued in corresponding Italian Patent Application No. 201700095075 dated Apr. 19, 2018.

*Primary Examiner* — J. Gregory Pickett
*Assistant Examiner* — Tia Cox
(74) *Attorney, Agent, or Firm* — Morgan, Lewis & Bockius LLP

(57) ABSTRACT

The present invention relates to a metal cage (1) for a tank (2) comprising a base (3), a plurality of horizontal annular tubular elements (4, 4') and a plurality of vertical tubular elements (5) associated with the horizontal annular tubular elements (5) and to the base (3) so as to define a containment volume for a tank (2).

According to the invention, the upper portion (6) of the vertical tubular elements (5) is flattened and has a folded end (7), inclined with respect to the direction of longitudinal development of the vertical tubular element (5). Moreover, the upper horizontal peripheral tubular element (4') comprises a plurality of recesses (8) configured to house said folded ends (7) of the vertical tubular elements (5). These folded ends (7) are welded to the upper horizontal peripheral tubular element (4') at said recesses (8).

15 Claims, 3 Drawing Sheets

(56) References Cited

U.S. PATENT DOCUMENTS

| | | | | |
|---|---|---|---|---|
| 6,290,082 B1* | 9/2001 | Van Giezen | ......... | B23K 33/006 |
| | | | | 206/386 |
| 7,025,223 B2* | 4/2006 | Hamm | ............... | B65D 77/0466 |
| | | | | 220/485 |
| 7,140,490 B2* | 11/2006 | Przytulla | ............ | B65D 77/0466 |
| | | | | 206/386 |
| 2002/0008108 A1* | 1/2002 | Van Giezen | ....... | B65D 77/0466 |
| | | | | 220/23.91 |
| 2003/0197010 A1 | 10/2003 | Maschio | | |
| 2004/0164082 A1* | 8/2004 | Schutz | ............... | B65D 77/0466 |
| | | | | 220/495.01 |
| 2007/0039955 A1* | 2/2007 | Schutz | ............... | B65D 77/0466 |
| | | | | 220/23.91 |
| 2011/0073510 A1* | 3/2011 | Cassina | ............. | B65D 77/0466 |
| | | | | 206/386 |
| 2013/0146607 A1* | 6/2013 | Schutz | ............... | B65D 77/0466 |
| | | | | 220/650 |
| 2015/0034519 A1* | 2/2015 | Przytulla | ............ | B65D 77/0466 |
| | | | | 206/386 |

\* cited by examiner

METAL CAGE FOR TANKS

The present invention relates to a metal cage for tanks.

Currently, a known way of transporting and preserving liquids is in tanks made of plastic, for example high density polyethylene, contained within a metal cage providing protection and containment.

Generally, such metal cages are provided with a base that allows palletisation of the tanks, which tanks generally have a parallelepiped shape allowing their orderly storage, and possibly also stacking.

The tanks generally have, at the top, an opening that can be closed with a stopper allowing its filling, and at the bottom, a tap allowing to draw the liquid contained in the tank.

The metal cages generally consist of tubular elements made of galvanised steel. Such cages comprise a plurality of vertical tubes, each welded to a plurality of horizontal tubular loops that surround the tank. At the lower end, the vertical tubes are associated with the base, possibly through an additional horizontal tubular base loop welded to the base itself.

Since the tanks described above can contain up to approximately 1000 litres of liquid, their lateral walls are often subjected to deformations due to the high internal pressures imposed by the liquid contained therein. The function of the metal cages, therefore, is to provide a rigid, but at the same sufficiently elastic structure to the assembly of tank and cage.

Moreover, since the aforesaid tanks, often stacked on one another, are used to transport liquids over land, on trains and trucks, the metal cage has to be sufficiently rigid and elastic to prevent structural collapses during transportation, when the mass of liquid contained in the tank is subject to oscillation.

The metal cages are so designed as to allow the removal and replacement of the tanks. Indeed the metal cages are generally closed only by some removable crosspieces, for example by means of screws. The removal of these crosspieces allows the extraction, from the top, of the tank contained in the metal cage, and hence its replacement.

However, known metal cages are not free of drawbacks, including the fact that their handling by operators, for example, but not only, in case of replacement of the tank, entails risks of injury.

In particular, the vertical tubular elements welded to the horizontal tubular loops are obtained by shearing steel tubes. The sheared ends of these tubes, even when pressed, have sharp edges and/or metal burrs that can injure the hands of the operators in charge of the handling of the metal cages.

Another drawback of known metal cages is that the weld between vertical and horizontal tubular elements is often imprecise and therefore unstable.

A specific task of the present invention is to provide a metal cage for tanks that solves the technical problems described above, overcomes the drawbacks and exceeds the limits of the prior art.

Within this task, a purpose of the present invention is to provide a metal cage that entails no risks for the operators in charge of the handling of the cage.

Another purpose of the invention is to provide a metal cage that has a particularly rigid and at the same time elastic structure.

Yet another purpose of the invention is to provide a metal cage whose tubular elements can be mutually welded easily and securely.

A further purpose of the invention is to provide a metal cage that is able to give the amplest assurance of reliability and safety in use.

Another purpose of the invention is to provide a metal cage that is easy to build and economically competitive if compared to the prior art.

The task set out above, as well as the mentioned purposes and others that will be more readily apparent below, are achieved by a metal cage for tanks, as set forth in claim 1.

Other features are provided in the dependent claims.

Further features and advantages will be more readily apparent from the description of a preferred, but not exclusive embodiment of a metal cage for tanks, illustrated by way of non-limiting indication with the aid of the accompanying drawings in which.

Figure 1:
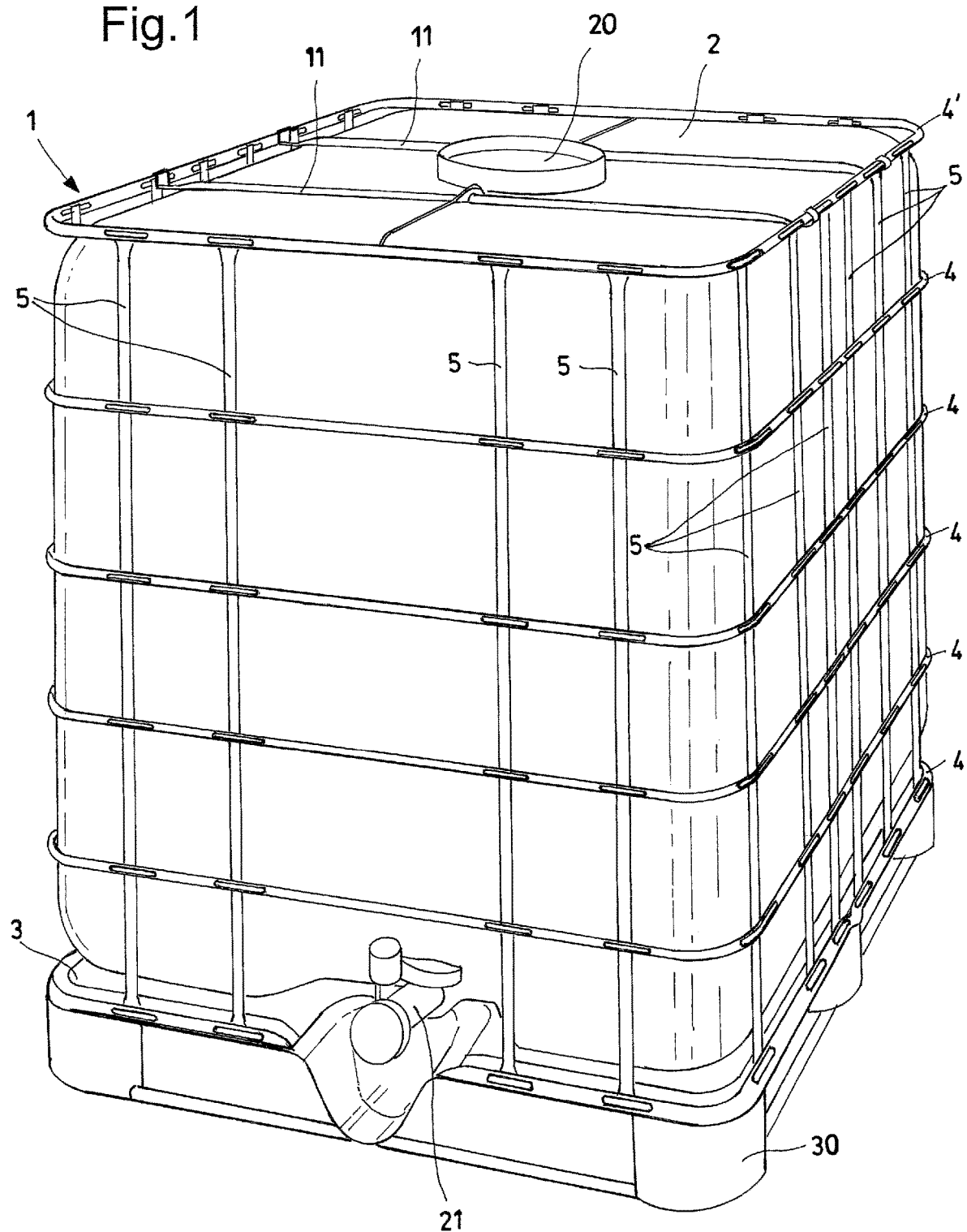
FIG. 1 is a perspective view of an embodiment of a metal cage for tanks, according to the invention.
Figure 2:
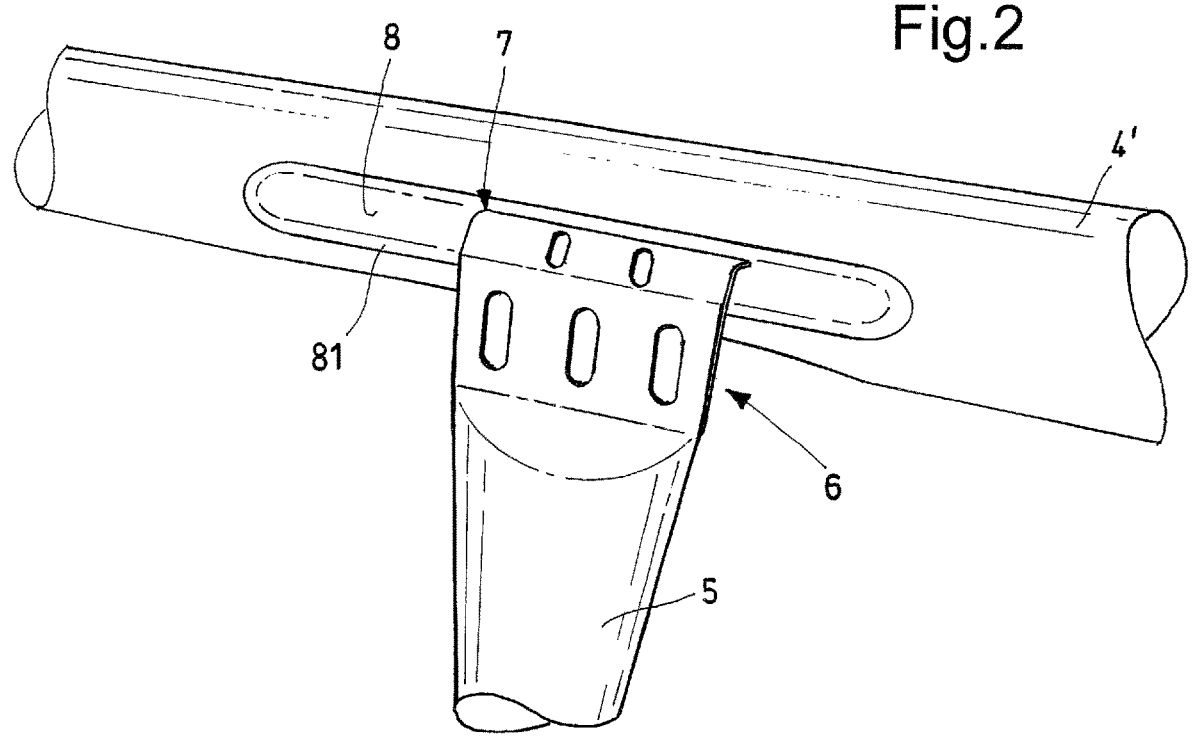
FIG. 2 is a perspective view, from inside the metal cage, of the junction point between a vertical tubular element and the upper horizontal tubular element of the metal cage of FIG. 1, according to the invention.
Figure 3:
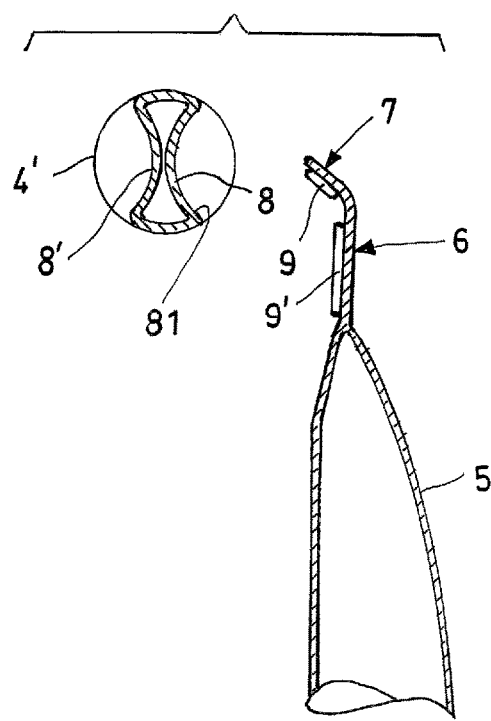
Figure 4:
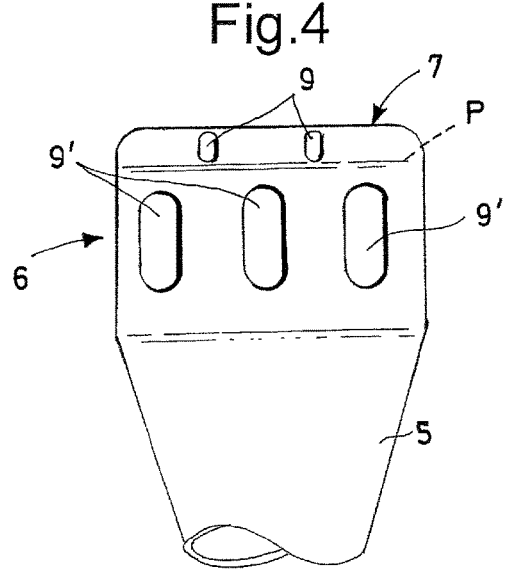
Figure 5:
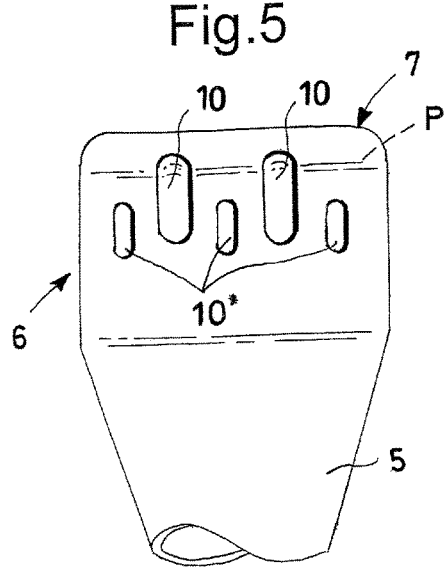
Figure 6:
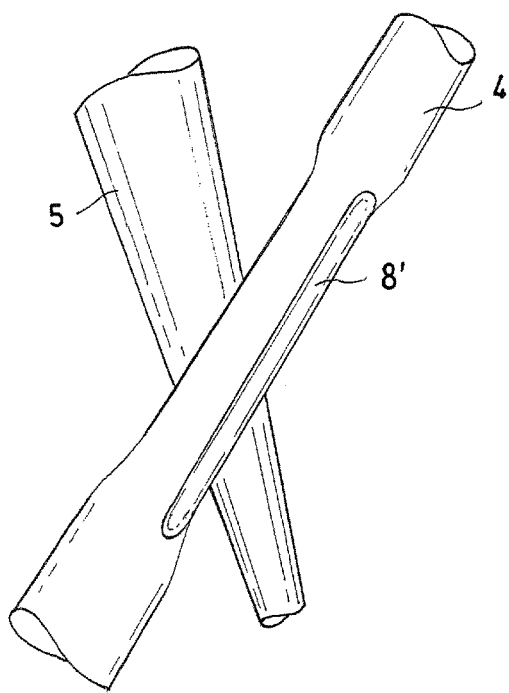
Figure 7:
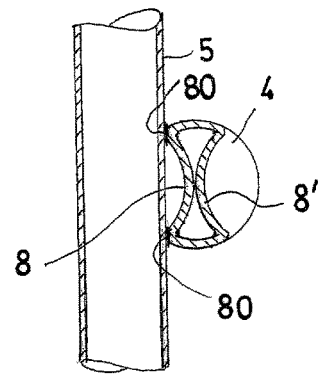
Figure 8:
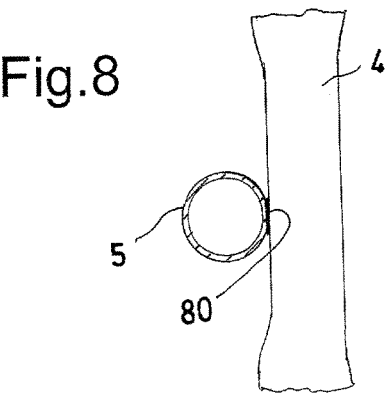

FIG. 3 schematically shows an exploded view of the section of the components of the metal cage illustrated in FIG. 2, according to the invention;

FIG. 4 is a front view of the upper terminal portion of a vertical tubular element of the metal cage of FIG. 1, according to the invention;

FIG. 5 is a front view of a preferred variant of the upper terminal portion of a vertical tubular element;

FIG. 6 is a perspective view, from outside the metal cage, of the junction point between a vertical tubular element and a horizontal tubular element of the metal cage of FIG. 1, according to the invention;

FIG. 7 is a lateral section view of the components of the metal cage, according to the invention;

FIG. 8 is a cross-section view of the components of the metal cage, according to the invention.

With reference to the aforementioned figures, the metal cage is indicated in its entirety with the reference numeral 1 while the tank contained therein is indicated with the reference numeral 2.

The term "tank" is used herein as synonymous of the term "vessel" to indicate the container of liquid contained in the metal cage.

The metal cage comprises a base 3, a plurality of horizontal annular tubular elements 4, 4' and a plurality of vertical tubular elements 5 associated with the horizontal annular tubular elements 5 and to the base 3 so as to define a containment volume for the tank 2.

The vertical tubular elements 5 and the horizontal annular tubular elements 4, 4' define a sort of metal grid that surrounds the lateral faces of the tank 2.

According to the invention, the upper portion 6 of the vertical tubular elements 5 is flattened and has a folded end 7, inclined with respect to the direction of longitudinal development of the vertical tubular element 5 itself. Moreover, according to the invention, the upper horizontal peripheral tubular element, indicated with the reference number 4', comprises a plurality of recesses 8 configured to house the folded ends 7 of the vertical tubular elements 5. These folded ends 7 are welded to the upper horizontal peripheral tubular element 4' at said recesses 8.

Advantageously, the folded end 7 of the vertical tubular elements 5 is electro-welded to the upper horizontal peripheral tubular element 4' inside the recess 8.

Preferably, said folded end 7 is fully contained inside the recess 8.

The coupling between the recesses 8 and the folded ends 7 of the vertical tubular elements 5 allows any sharp corners or edges and/or sharp metallic burrs present at the end of the vertical tubular elements 5 not to protrude either at the top or laterally with respect to the upper horizontal peripheral tubular element 4'. In particular, any sharp corners or edges and/or sharp metallic burrs present at the end of the vertical tubular elements 5 are substantially contained inside the recesses 8. In this way, the risk that operators in charge of the handling of the metal cage 1 may be injured is completely eliminated.

The upper portion 6 of the vertical tubular elements 5 advantageously comprises a plurality of projections 9, 9', 10, 10' protruding towards the upper horizontal peripheral tubular element 4' and configured to define a plurality of points of contact between the vertical tubular elements 5 and the upper horizontal peripheral tubular element 4', where said points of contact are adapted to optimise the welding of said upper portion 6 to the upper horizontal peripheral tubular element 4'.

Advantageously, as shown in particular in FIG. 5, the upper portion 6 of the vertical tubular elements 5 comprises a plurality of projections 10 protruding towards the upper horizontal peripheral tubular element 4', which are arranged astride the folding line P of the folded end 7. Said projections 10 define points of contact with the lower edge 81 of the recess 8 which allow to optimise the electrical welding process of the vertical tubular element 5 with the horizontal tubular element 4.

Advantageously, as shown in particular in FIG. 5, additional projections 10' may be provided, arranged below the folding line P of the folded end 7, also intended to define the points of contact with the upper horizontal peripheral tubular element 4', for example just below the recess 8.

Alternatively, as shown in FIG. 4, projections 9 may be present, protruding towards the upper horizontal peripheral tubular element 4', obtained in the folded end 7 of the vertical tubular element 5, above the folding line P, which are intended to define points of contact with the upper horizontal peripheral tubular element 4' lying fully inside the recess 8.

In this case, too, additional projections 9' may be provided, arranged below the folding line P of the folded end 7, intended to define the points of contact with the upper horizontal peripheral tubular element 4', for example just below the recess 8.

Preferably, each of the horizontal annular tubular elements 4, 4' comprises a plurality of pairs of opposite recesses 8, 8'.

Said pairs of opposite recesses 8, 8' are advantageously obtained through deformation by compression operations of the tubular elements 4, 4'.

Advantageously, a single type of horizontal peripheral tubular element 4, 4' can be used indistinctly to construct all the horizontal components of the metal cage 1.

Therefore, a horizontal peripheral tubular element can be used as upper horizontal peripheral tubular element 4', to be welded to the terminal portions 6 of the vertical tubular elements 5, or as intermediate peripheral tubular element 4, or as lower horizontal peripheral tubular element 4, for example associated with the base 3.

Advantageously, the base 3 can comprise a palletisable base structure 30.

Advantageously, the vertical tubular elements 5 are welded to the horizontal annular tubular elements 4 at the pairs of opposite recesses 8, 8'.

In this way the metal cage has a plurality of structural reinforcements at the junction points between the vertical tubular elements 5 and the horizontal annular tubular elements 4.

In fact the deformation by compression of the horizontal annular tubular elements 4 that results in the formation of the pairs of opposite recesses 8, 8', provides greater structural rigidity to the elements.

Advantageously, the edges of the recess 8 of the horizontal peripheral tubular element 4 which faces the vertical tubular element 5 define two contact points 80 between said vertical tubular element 5 and said horizontal peripheral tubular element 4 which are adapted to optimise the welding of the cylindrical surface of the vertical tubular elements 5 to the edges of the recess 8 of the horizontal peripheral tubular element 4.

Advantageously, the vertical tubular elements 5 are electrically welded to the edges of the recesses 8 of the horizontal annular tubular elements 4, at the aforesaid two points of contact 80.

Advantageously, the tubular elements 4 and 5 have a substantially circular section, with the exception of the flattened, folded, pressed or deformed portions.

The present invention further relates to a device for containing and transporting liquids comprising a metal cage 1 as described above, and a tank 2 contained inside said metal cage 1.

The tank 2 comprises, at the top, an opening able to be closed with a stopper 20 which allows its filling, and at the bottom, a tap 21 that allows to draw the liquid contained in the tank 2.

Advantageously, the metal cage 1 comprises a plurality of upper crosspieces 11 removably associated with the upper horizontal peripheral tubular element 4' able to block the tank 2 at the top inside the metal cage 1.

Said upper crosspieces 11 can be associated to the upper horizontal peripheral tubular element 4' by means of removable fastening means such as screws and bolts, or the like.

In practice, it has been verified that the metal cage for tanks, according to the present invention, performs its task and achieves the set purposes because it allows to protect the safety of the operators in charge of handling it.

Another advantage of the metal cages, according to the invention, is that it is particularly strong.

Another advantage of the metal cage, according to the invention, is that it can be easily constructed, assembling the various components with ease.

In particular, the vertical tubular elements can be easily welded both to the upper horizontal peripheral tubular element, and to the other horizontal annular tubular elements, through electrical welds executable in clearly identifiable points, such as the points at the terminal folded end of the vertical tubular elements, for example defined by the projections present in that area, or the points at the edges of the recesses of the horizontal annular tubular elements that come in contact with the lateral surface of the vertical tubular elements.

The metal cage thus conceived is susceptible to numerous modifications and variants all falling within the scope of the inventive concept; moreover, all details can be replaced with other technically equivalent elements. In practice, the materials used, as well as their dimensions, can be of any type according to the technical requirements.

The invention claimed is:

1. Metal cage for a tank, comprising a base, a plurality of annular tubular horizontal elements and a plurality of vertical tubular elements associated to said annular tubular horizontal elements and to said base so as to define a containment volume for a tank, characterised in that the upper portion of said vertical tubular elements is flattened and has a folded end, wherein said folded end is tilted with respect to the longitudinal extension direction of the vertical tubular element along a folding line (P), and in that the tubular horizontal perimeter upper element comprises a plurality of recesses configured to accommodate said folded ends of said vertical tubular elements above said folding line (P), said folded ends being welded to said tubular horizontal perimeter upper element at said recesses above said folding line (P), wherein said folded ends of said vertical tubular elements above said folding line (P) are entirely contained within said recesses of said tubular horizontal perimeter upper element.

2. Metal cage for a tank, according to claim 1, characterized in that said folded end of said vertical tubular elements is electro-welded to said tubular horizontal perimeter upper element within said recess.

3. Metal cage for a tank, according to claim 1, characterized in that said upper portion of said vertical tubular elements comprises a plurality of projections protruding towards said tubular horizontal perimeter upper element and configured so as to define a plurality of contact points between said vertical tubular elements and said tubular horizontal perimeter upper element adapted to optimize welding of said upper portion of said vertical tubular elements to said tubular horizontal perimeter upper element.

4. Metal cage for a tank, according to claim 3, characterized in that said upper portion of said vertical tubular elements comprises a plurality of said projections protruding towards said tubular horizontal perimeter upper element arranged astride the folding line (P) of said folded end.

5. Metal cage for a tank, according to claim 3, characterized in that a plurality of said projections protruding towards said tubular horizontal perimeter upper element are obtained in said folded end of said vertical tubular element.

6. Metal cage for a tank, according to claim 1, wherein said plurality of annular tubular horizontal elements comprises said upper tubular horizontal perimeter element, one lower tubular horizontal perimeter element and one or more intermediate peripheral tubular elements, wherein each of said annular tubular horizontal elements comprises a plurality of pairs of opposed recesses.

7. Metal cage for a tank, according to claim 1, characterized in that said vertical tubular elements are welded to said annular tubular horizontal elements at said plurality of recesses.

8. Metal cage for a tank, according to claim 1, characterized in that the edges of the recess of said tubular perimeter horizontal element facing said vertical tubular element define two contact points between said vertical tubular element and said tubular perimeter horizontal element adapted to optimize welding of the cylindrical surface of said vertical tubular elements to said edges of said recess of said tubular perimeter horizontal element.

9. Device for containing and transporting liquids comprising a metal cage according to claim 1, and a tank contained within said metal cage.

10. Metal cage for a tank, according to claim 4, characterized in that a plurality of said projections protruding towards said tubular horizontal perimeter upper element are obtained in said folded end of said vertical tubular element.

11. Metal cage for a tank according to claim 1, wherein said plurality of annular tubular horizontal elements comprises said upper tubular horizontal perimeter element, one lower tubular horizontal perimeter element and one or more intermediate peripheral tubular elements, wherein each of said annular tubular horizontal elements are interchangeable.

12. Metal cage for a tank, comprising a base, a plurality of annular tubular horizontal elements and a plurality of vertical tubular elements associated to said annular tubular horizontal elements and to said base so as to define a containment volume for a tank,
 - characterized in that the upper portion of said vertical tubular elements is flattened and has a folded end, tilted with respect to the longitudinal extension direction of the vertical tubular element, and in that the tubular horizontal perimeter upper element comprises a plurality of recesses configured to accommodate said folded ends of said vertical tubular elements, said folded ends being welded to said tubular horizontal perimeter upper element at said recesses,
 - characterized in that said upper portion of said vertical tubular elements comprises a plurality of projections protruding towards said tubular horizontal perimeter upper element and configured so as to define a plurality of contact points between said vertical tubular elements and said tubular horizontal perimeter upper element adapted to optimize welding of said upper portion of said vertical tubular elements to said tubular horizontal perimeter upper element, and
 - characterized in that said upper portion of said vertical tubular elements comprises a plurality of said projections protruding towards said tubular horizontal perimeter upper element arranged astride the folding line (P) of said folded end.

13. Metal cage for a tank according to claim 12, wherein said folded ends of said vertical tubular elements are entirely contained within said recesses of said tubular horizontal perimeter upper element.

14. Metal cage for a tank, comprising a base, a plurality of annular tubular horizontal elements and a plurality of vertical tubular elements associated to said annular tubular horizontal elements and to said base so as to define a containment volume for a tank,
 - characterized in that the upper portion of said vertical tubular elements is flattened and has a folded end, tilted with respect to the longitudinal extension direction of the vertical tubular element, and in that the tubular horizontal perimeter upper element comprises a plurality of recesses configured to accommodate said folded ends of said vertical tubular elements, said folded ends being welded to said tubular horizontal perimeter upper element at said recesses,
 - characterized in that said upper portion of said vertical tubular elements comprises a plurality of projections protruding towards said tubular horizontal perimeter upper element and configured so as to define a plurality of contact points between said vertical tubular elements and said tubular horizontal perimeter upper element adapted to optimize welding of said upper portion of said vertical tubular elements to said tubular horizontal perimeter upper element, and
 - characterized in that a plurality of said projections protruding towards said tubular horizontal perimeter upper element are obtained in said folded end of said vertical tubular element.

15. Metal cage for a tank according to claim 14, wherein said folded ends of said vertical tubular elements are entirely contained within said recesses of said tubular horizontal perimeter upper element.

* * * * *